US011394744B2

(12) United States Patent
Maeda et al.

(10) Patent No.: US 11,394,744 B2
(45) Date of Patent: Jul. 19, 2022

(54) DDOS-HANDLING DEVICE, DDOS-HANDLING METHOD, AND PROGRAM

(71) Applicant: Nippon Telegraph and Telephone Corporation, Tokyo (JP)

(72) Inventors: Hiroaki Maeda, Tokyo (JP); Hisashi Kojima, Tokyo (JP); Takeshi Kuwahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 48 days.

(21) Appl. No.: 17/257,931

(22) PCT Filed: Jul. 12, 2019

(86) PCT No.: PCT/JP2019/027741
§ 371 (c)(1),
(2) Date: Jan. 5, 2021

(87) PCT Pub. No.: WO2020/017460
PCT Pub. Date: Jan. 23, 2020

(65) Prior Publication Data
US 2021/0288996 A1 Sep. 16, 2021

(30) Foreign Application Priority Data
Jul. 17, 2018 (JP) .............................. JP2018-133925

(51) Int. Cl.
*H04L 9/40* (2022.01)
*H04L 12/66* (2006.01)
(Continued)

(52) U.S. Cl.
CPC .......... *H04L 63/1458* (2013.01); *H04L 12/66* (2013.01); *H04L 47/726* (2013.01); *H04L 47/788* (2013.01)

(58) Field of Classification Search
CPC ... H04L 63/1458; H04L 12/66; H04L 47/726; H04L 47/788; H04L 47/822; H04L 47/826; H04L 47/828
See application file for complete search history.

(56) References Cited

U.S. PATENT DOCUMENTS 6,880,090 B1 * 4/2005 Shawcross .......... H04L 61/2076
709/225
8,397,284 B2 * 3/2013 Kommareddy ..... H04L 63/1458
726/13
(Continued)

OTHER PUBLICATIONS

Sufian Hameen & Hassan A Khan, "Leveraging SDN for collaborative DDoS mitigation", IEEE Xplore, Mar. 1, 2017, NetSys Conference date: Mar. 13, 2017-Mar. 16, 2017 (Year: 2017).*
(Continued)

*Primary Examiner* — Aftab N. Khan
(74) *Attorney, Agent, or Firm* — Fish & Richardson P.C.

(57) ABSTRACT

A DDoS attack handling technology is provided in which even when a plurality of IP addresses are attacked at the same time, resource load distribution between sites can be achieved while an increase in delay of target-addressed communications due to the handling of DDoS attacks is prevented. A DDoS handling apparatus 100 includes a load distribution determination unit 112 that determines whether load distribution processing is necessary, a processability determination unit 113 that determines whether load distribution processing is capable of being performed within a desired time, a grouping processing unit 115 that groups target-addressed communications into a plurality of groups, a load distribution processing unit 116 that determines, for each group, a mitigation site to be used to handle the target-addressed communications from among a plurality of mitigation sites, and an attack handling setting unit 117 that performs route control of the target-addressed communica- (Continued)

tions. The DDoS handling apparatus 100 further includes a load distribution target reduction unit 114 that reduces the number of the target-addressed communications that are targets of the load distribution processing.

9 Claims, 12 Drawing Sheets

(51) Int. Cl.
*H04L 47/726* (2022.01)
*H04L 47/78* (2022.01)

(56) References Cited

U.S. PATENT DOCUMENTS

| | | | | |
|---|---|---|---|---|
| 9,473,530 | B2* | 10/2016 | Bhogavilli | H04L 63/0236 |
| 9,774,619 | B1* | 9/2017 | Radlein | H04L 63/1441 |
| 10,097,566 | B1* | 10/2018 | Radlein | H04L 63/14 |
| 2014/0096251 | A1* | 4/2014 | Doctor | H04L 63/1441 |
| | | | | 726/23 |

OTHER PUBLICATIONS

Maeda et al., "A Study of Large-Scale DDoS Mitigation Mechanism for Global-Scale Autonomous Systems," Proceedings of the 2018 IEICEGeneral Conference, Mar. 6, 2018, p. 134, 3 pages (with English translation).

Arbornetworks.com, [online], "Powerful DDoS Protection Made Simple," 2017, retrieved on Dec. 22, 2017, retrieved from URL<https://www.arbornetworks.com/ddos-protection-products/arbor-aps>, 6 pages.

Maeda et al., "A study of a highly scalable DDoS mitigation mechanism," Proceedings of the 2016 Institute of Electronics, Information and Communication Engineers, Communication Society 2, Sep. 6, 2016, p. 87, 5 pages (with English Translation).

Maeda et al., "A Study of Large-Scale DDoS Mitigation Mechanism Considering Communication Delay for Global-Scale Autonomous Systems," IEICE, Technical Report, 2018, 117(460):15-20, 13 pages (with English Translation).

* cited by examiner (PRESENT FOR EACH GW)

| GW NUMBER | AREA OF GW | DESTINATION IP ADDRESS (IDENTIFIER BASED ON UNITS OF PROCESSING) | ADJACENT AS NUMBER THAT IS SOURCE OF INFLOW | ADJACENT AS NUMBER THAT IS DESTINATION OF OUTFLOW | COMMUNICATION AMOUNT PER UNIT OF PROCESSING |
|---|---|---|---|---|---|
| 6 | ASIA | IP ADDRESS OF SYSTEM 1 | GIVEN AS NUMBER | — | 4 Gbps |
| | | IP ADDRESS OF SYSTEM 2 | GIVEN AS NUMBER | — | 4 Gbps |
| | | ... | GIVEN AS NUMBER | — | ... |

Fig. 6

| SITE NUMBER | MAXIMUM RESOURCE AMOUNT OF MITIGATION APPARATUS | AVAILABLE RESOURCE AMOUNT OF MITIGATION APPARATUS |
|---|---|---|
| 1 | 60 Gbps | 60 Gbps |
| 2 | 60 Gbps | 60 Gbps |
| 3 | 60 Gbps | 15 Gbps |

Fig. 7

| GW NUMBER | AREA OF GW | SITE NUMBER | AREA OF SITE |
|---|---|---|---|
| 1 | NORTH AMERICA | 1 | NORTH AMERICA |
| 2 | EUROPE | 2 | EUROPE |
| 3 | ASIA | 3 | ASIA |
| 4 | NORTH AMERICA | 1 | NORTH AMERICA |
| 5 | EUROPE | 2 | EUROPE |
| 6 | ASIA | 3 | ASIA |

Fig. 8

(WHEN UNITS OF PROCESSING ARE DESTINATION IP ADDRESSES)

| ATTACK NUMBER | TARGET IP ADDRESS (IDENTIFIER BASED ON UNITS OF PROCESSING) |
|---|---|
| 1 | IP ADDRESS OF TARGET SYSTEM 1 |
| . . . | . . . |
| 30 | IP ADDRESS OF TARGET SYSTEM 30 |
| 31 | IP ADDRESS OF TARGET SYSTEM 31 |

Fig. 9

| TARGET IP ADDRESS (IDENTIFIER BASED ON UNITS OF PROCESSING) | CURRENT HANDLING STATE | EXCLUSION FLAG | ENTRANCE INFORMATION ||||||| EXIT AREA |
| --- | --- | --- | --- | --- | --- | --- | --- | --- | --- |
| | | | INFORMATION OF AREA 1 || INFORMATION OF AREA 2 || INFORMATION OF AREA 3 || |
| | | | AREA | COMMUNICATION FEE OF TARGET-ADDRESSED COMMUNICATIONS IN UNITS OF PROCESSING | AREA | COMMUNICATION FEE OF TARGET-ADDRESSED COMMUNICATIONS IN UNITS OF PROCESSING | AREA | COMMUNICATION FEE OF TARGET-ADDRESSED COMMUNICATIONS IN UNITS OF PROCESSING | |
| IP ADDRESS OF TARGET SYSTEM 1 | 1 | FALSE | NORTH AMERICA | 0 Gbps | EUROPE | 0 Gbps | ASIA | 4 Gbps | NORTH AMERICA |
| ... | ... | ... | ... | ... | ... | ... | ... | ... | ... |
| IP ADDRESS OF TARGET SYSTEM 30 | 1 | FALSE | NORTH AMERICA | 0 Gbps | EUROPE | 0 Gbps | ASIA | 1 Gbps | NORTH AMERICA |
| IP ADDRESS OF TARGET SYSTEM 31 | NULL | FALSE | NORTH AMERICA | 0 Gbps | EUROPE | 0 Gbps | ASIA | 20 Gbps | EUROPE |

Fig. 10

| GROUP NUMBER | EXIT SITE NUMBER | CURRENT HANDLING STATE | INFORMATION WHEN FIRST SITE IS USED ||||||| INFORMATION WHEN SECOND SITE IS USED ||
| | | | INFORMATION OF AREA 1 || INFORMATION OF AREA 2 || INFORMATION OF AREA 3 || | |
| | | | SITE NUMBER | REQUIRED RESOURCE AMOUNT | SITE NUMBER | REQUIRED RESOURCE AMOUNT | SITE NUMBER | REQUIRED RESOURCE AMOUNT | SITE NUMBER | REQUIRED RESOURCE AMOUNT |
| 1 | 1 | 1 | 1 | 0 Gbps | 2 | 0 Gbps | 3 | 6 Gbps | 1 | 6 Gbps |
| 2 | 1 | 1 | 1 | 0 Gbps | 2 | 0 Gbps | 3 | 6 Gbps | 1 | 6 Gbps |
| 3 | 1 | 1 | 1 | 0 Gbps | 2 | 0 Gbps | 3 | 6 Gbps | 1 | 6 Gbps |
| 4 | 1 | 1 | 1 | 0 Gbps | 2 | 0 Gbps | 3 | 6 Gbps | 1 | 6 Gbps |
| 5 | 1 | 1 | 1 | 0 Gbps | 2 | 0 Gbps | 3 | 6 Gbps | 1 | 6 Gbps |
| 6 | 2 | 1 | 1 | 0 Gbps | 2 | 0 Gbps | 3 | 22 Gbps | 2 | 22 Gbps |
| 7 | 2 | 1 | 1 | 0 Gbps | 2 | 0 Gbps | 3 | 2 Gbps | 2 | 2 Gbps |
| 8 | 2 | 1 | 1 | 0 Gbps | 2 | 0 Gbps | 3 | 2 Gbps | 2 | 2 Gbps |
| 9 | 2 | 1 | 1 | 0 Gbps | 2 | 0 Gbps | 3 | 2 Gbps | 2 | 2 Gbps |
| 10 | 2 | 1 | 1 | 0 Gbps | 2 | 0 Gbps | 3 | 2 Gbps | 2 | 2 Gbps |

Fig. 11

(PRESENT FOR EACH GROUP)

| GROUP NUMBER | TARGET IP ADDRESS (IDENTIFIER BASED ON UNITS OF PROCESSING) |
|---|---|
| 1 | IP ADDRESS OF SYSTEM 1 |
|   | IP ADDRESS OF SYSTEM 6 |

Fig. 12

| TARGET IP ADDRESS (IDENTIFIER BASED ON UNITS OF PROCESSING) | ENTRANCE INFORMATION | | | | | | | | |
|---|---|---|---|---|---|---|---|---|---|
| | INFORMATION OF AREA 1 | | | INFORMATION OF AREA 2 | | | INFORMATION OF AREA 3 | | |
| | AREA | SITE NUMBER | REQUIRED RESOURCE AMOUNT | AREA | SITE NUMBER | REQUIRED RESOURCE AMOUNT | AREA | SITE NUMBER | REQUIRED RESOURCE AMOUNT |
| IP ADDRESS OF TARGET SYSTEM 1 | NORTH AMERICA | 1 | 0 Gbps | EUROPE | 2 | 0 Gbps | ASIA | 3 | 4 Gbps |
| ... | ... | ... | ... | ... | ... | ... | ... | ... | ... |
| IP ADDRESS OF TARGET SYSTEM 30 | NORTH AMERICA | 1 | 0 Gbps | EUROPE | 2 | 0 Gbps | ASIA | 3 | 1 Gbps |
| IP ADDRESS OF TARGET SYSTEM 31 | NORTH AMERICA | 1 | 0 Gbps | EUROPE | 2 | 0 Gbps | ASIA | 3 | 20 Gbps |

Fig. 13

| TARGET IP ADDRESS (IDENTIFIER BASED ON UNITS OF PROCESSING) | EXIT AREA | EXIT SITE NUMBER | REQUIRED RESOURCE AMOUNT |
|---|---|---|---|
| IP ADDRESS OF TARGET SYSTEM 1 | NORTH AMERICA | 1 | 4 Gbps |
| ... | ... | ... | ... |
| IP ADDRESS OF TARGET SYSTEM 30 | NORTH AMERICA | 1 | 1 Gbps |
| IP ADDRESS OF TARGET SYSTEM 31 | EUROPE | 2 | 20 Gbps |

Fig. 14

DDOS-HANDLING DEVICE, DDOS-HANDLING METHOD, AND PROGRAM

CROSS-REFERENCE TO RELATED APPLICATIONS

This application is a National Stage application under 35 U.S.C. § 371 of International Application No. PCT/JP2019/027741, having an International Filing Date of Jul. 12, 2019, which claims priority to Japanese Application Serial No. 2018-133925, filed on Jul. 17, 2018. The disclosure of the prior application is considered part of the disclosure of this application, and is incorporated in its entirety into this application

TECHNICAL FIELD

The present disclosure relates to a network technology that achieves handling of distributed denial of service (DDoS) attacks.

BACKGROUND ART

A technology that achieves resource load distribution between mitigation sites and improves DDoS handling capability while preventing an increase in delay of target-addressed communications due to handling of DDoS attacks by selectively using "handling at a mitigation site close to a transmission source (a network entrance)" or "handling at a mitigation site close to a destination (a network exit)" depending on the target internet protocol (IP) address of each DDoS attack in an autonomous system (AS) in which a plurality of mitigation sites (in each of which one or more mitigation apparatuses described in Non Patent Literature 1 or the like are installed) are distributed and provided in a plurality of areas has been proposed (Non Patent Literature 2).

CITATION LIST

Non Patent Literature

Non Patent Literature 1: Arbor Networks, "DDOS PROTECTION BY ARBOR NETWORKS APS," [online], [retrieved Jun. 29, 2018], Internet <URL: http://www.arbornetworks.com/ddos-protection-products/arbor-aps>

Non Patent Literature 2: Hiroaki Maeda et al., "A Study on Large-Scale DDoS Attack handlings in Consideration of Delay in Global-Scale AS," IEICE Tech. Rep., vol. 117, no. 460, IN2017-92, pp. 15-20, March 2018

SUMMARY OF THE INVENTION

Technical Problem

According to the background art, a combination that enables handling such that the resource amount of the mitigation apparatus in each site does not exceed the maximum resource amount thereof is searched for among combinations for handling of each target IP address (/32) at a site close to an entrance or a site close to an exit. Thus, time complexity is $O(n^2)$ (n is the number of target IPs) in the worst case and resource load distribution cannot be performed in a realistic time when a plurality of IP addresses are attacked at the same time (a plurality of targets are handled at the same time).

In view of these problems, it is an object of the present disclosure to provide a DDoS attack handling technology that can achieve resource load distribution between sites while preventing an increase in delay of target-addressed communications due to handling of DDoS attacks even when a plurality of IP addresses are attacked at the same time (a plurality of targets are handled at the same time).

Means for Solving the Problem

To achieve the object, the present disclosure provides a DDoS handling apparatus configured to handle target-addressed communications addressed to targets of DDoS attacks, the target-addressed communications flowing, from at least one adjacent autonomous system, in an autonomous system including a plurality of mitigation sites against DDoS attacks, the DDoS handling apparatus including a load distribution determination unit configured to determine whether load distribution processing is to be performed based on both available resource information of a mitigation site corresponding to a gateway device, through which the target-addressed communications flow in, and a communication amount of the target-addressed communications, a processability determination unit configured to determine whether the load distribution processing is capable of being performed within a desired time based on the number of the target-addressed communications when the load distribution determination unit has determined that the load distribution processing is to be performed, a grouping processing unit configured to group the target-addressed communications into a plurality of groups when the processability determination unit has determined that the load distribution processing is not capable of being performed, a load distribution processing unit configured to, for each group, determine a mitigation site to be used to handle the target-addressed communications belonging to the group from among the plurality of mitigation sites such that a shortage of resources of the mitigation sites is resolved for the target-addressed communications belonging to the group, and an attack handling setting unit configured to perform route control such that the target-addressed communications pass through the mitigation site determined by the load distribution processing unit.

The present disclosure also provides a DDoS handling apparatus configured to handle target-addressed communications addressed to targets of DDoS attacks, the target-addressed communications flowing, from at least one adjacent autonomous system, in an autonomous system including a plurality of mitigation sites against DDoS attacks, the DDoS handling apparatus including a load distribution determination unit configured to determine whether load distribution processing is to be performed based on both available resource information of a mitigation site corresponding to a gateway device, through which the target-addressed communications flow in, and a communication amount of the target-addressed communications, a processability determination unit configured to determine whether the load distribution processing is capable of being performed within a desired time based on the number of the target-addressed communications when the load distribution determination unit has determined that the load distribution processing is to be performed, a load distribution target reduction unit configured to reduce the number of the target-addressed communications that are targets of the load distribution processing when the processability determination unit has determined that the load distribution processing is not capable of being performed, a load distribution processing unit configured to, for each target-addressed communication after the reduction, determine a mitigation site to be used to handle the target-addressed communication from among the plurality of mitigation sites such that a shortage of resources of the mitigation sites is resolved for the target-addressed communication, and an attack handling setting unit configured to perform route control such that the target-addressed communication passes through the mitigation site determined by the load distribution processing unit.

Effects of the Invention

According to the present disclosure, resource load distribution between sites is performed while an increase in delay of target-addressed communications due to handling is prevented even when a plurality of IP addresses are attacked at the same time (a plurality of targets are handled at the same time), thereby enabling handling of more DDoS attacks.

BRIEF DESCRIPTION OF DRAWINGS

FIG. 6 shows an example of a traffic information table according to the embodiment of the present disclosure.

FIG. 7 shows an example of a mitigation site information table according to the embodiment of the present disclosure.

FIG. 8 shows an example of a GW to site correspondence information table according to the embodiment of the present disclosure.

FIG. 9 shows an example of an attack identification information table according to the embodiment of the present disclosure.

FIG. 10 shows an example of an attack information table according to the embodiment of the present disclosure.

FIG. 11 shows an example of a group information table according to the embodiment of the present disclosure.

FIG. 12 shows an example of a group to communication identifier correspondence information table according to the embodiment of the present disclosure.

FIG. 13 shows an example of a first site information table for each attack according to the embodiment of the present disclosure.

FIG. 14 shows an example of a second site information table for each attack according to the embodiment of the present disclosure.

DESCRIPTION OF EMBODIMENTS

First, the premise of the present embodiment will be described. In the present embodiment, an AS to which the present embodiment is applied includes a plurality of mitigation sites, and a different mitigation site is used depending on a gateway (GW) (a router at the boundary with another AS) through which a target-addressed communication flows in (for example, a site close to the source of inflow of the target-addressed communication is used to handle the target-addressed communication). It is also assumed that traffic control in the technology according to the present disclosure is performed in a mode of changing a route within the own AS and a mode of changing a route within an adjacent AS. In particular, when traffic control is performed by changing a route in an adjacent AS, it is premised that there is at least one adjacent AS having connection points at two or more GWs of different sites. That is, there is at least one adjacent AS which allows a bypass route to exist in the adjacent AS when the target-addressed communication flows in via the adjacent AS.

When traffic control is performed in an adjacent AS, the adjacent AS uses a multi-exit discriminator (MED) of a border gateway protocol (BGP) or the like, such that it is possible to switch between (1) hot-potato routing and (2) cold-potato routing described below to route a communication from an AS to which the technology according to the present disclosure is applied to a specific destination.

(1) Hot-potato routing is a routing method in which a communication between ISPs is passed through a connection point close to the transmission source of the communication when the ISPs peer with each other through a plurality of connection points. For example, a communication that is to be transferred from an adjacent AS to an AS to which the technology according to the present disclosure is applied and that has flowed in the adjacent AS from Asia is passed to the AS through a connection point in Asia closest to the inflow source.

(2) Cold-potato routing is a routing method in which traffic is held in a network close to the transmission source of the traffic as long as possible. For example, a communication that is to be transferred from an adjacent AS to an AS to which the technology according to the present disclosure is applied and that has flowed in the adjacent AS from Asia is delivered up to Europe within the adjacent AS and passed to the AS through a connection point in Europe if the destination of the communication is Europe.

Figure 1:
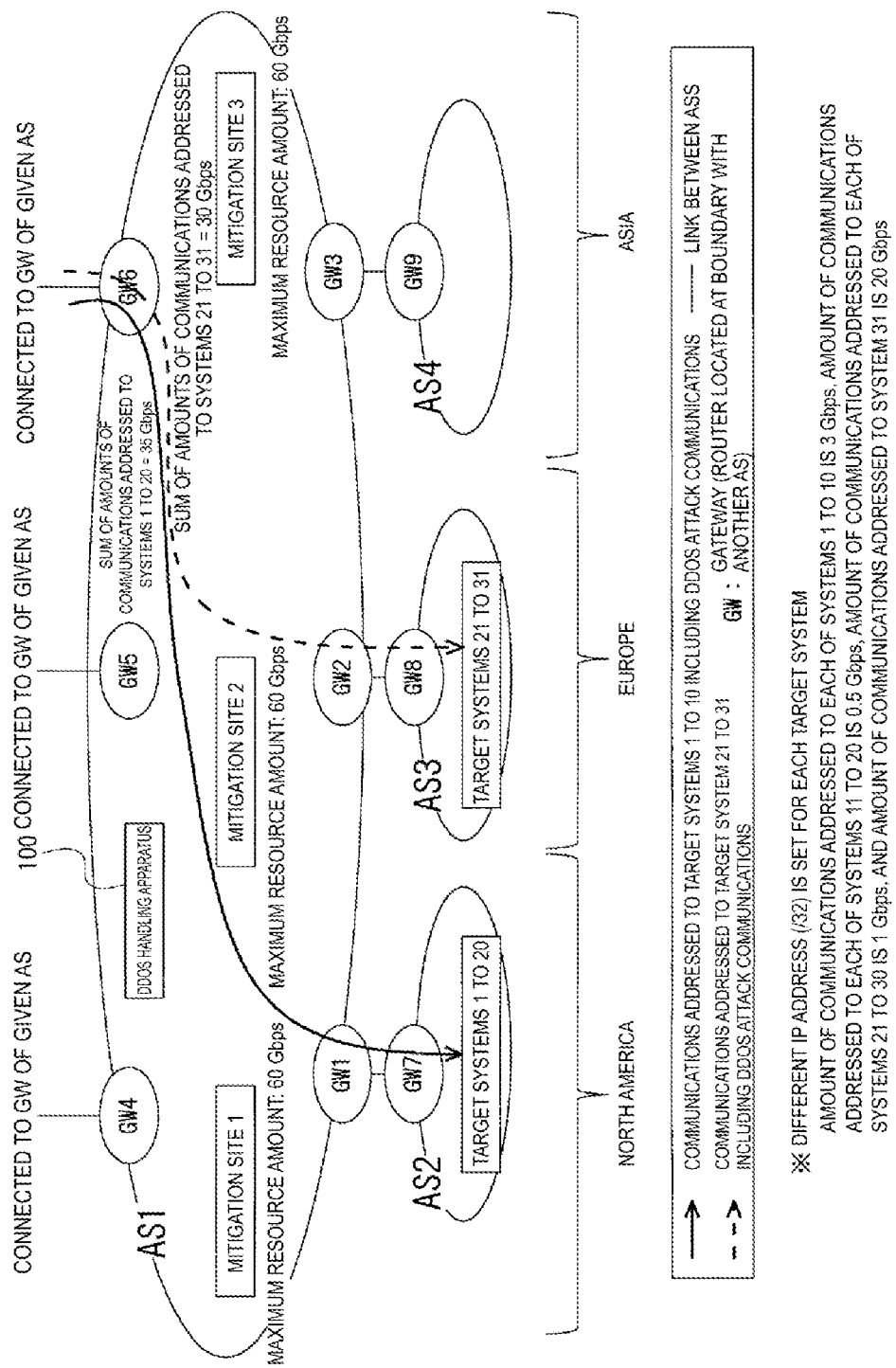
FIG. 1 is a configuration diagram of a network (Internet) according to an embodiment of the present disclosure.

A system according to an embodiment of the present disclosure will be described with reference to the drawings. FIG. 1 is a configuration diagram of a network (Internet) according to the embodiment of the present disclosure.

As illustrated in FIG. 1, a network includes a given number of ASs (such as AS10-1 to AS10-4), which are interconnected to form a network topology of a network imitating the Internet.

In the present embodiment, it is assumed that the AS1 provides a DDoS handling service to the AS2, AS3, and AS4 that have a transit contract with the AS1 and further includes a DDoS handling apparatus 100 of the present disclosure.

A GW1, a GW4, a GW7, and a mitigation site 1 are equipment present in North America, a GW2, a GW5, a GW8, and a mitigation site 2 are equipment present in Europe, and a GW3, a GW6, a GW9, and a mitigation site 3 are equipment present in Asia. A gateway (GW) indicates a router/switch located at a boundary with a network of a customer or the like.

Units of communication in which processing of the present disclosure is performed on target-addressed communications of DDoS attacks are defined as "units of processing." Any units such as "units of 5-tuple flows," each including transmitting/receiving IP addresses, transmitting/receiving port numbers, and a protocol, and "units of entrance GW+target IP address" in addition to "units of destination (target) IP addresses" similar to those of the background art may be applied as units of processing. Particularly, the case where units of processing are destination IP addresses will be described in the present embodiment.

Next, a configuration of an AS including the DDoS handling apparatus 100 according to the embodiment of the present disclosure will be described with reference to FIG. 2 which illustrates an example of the AS1.

Figure 2:
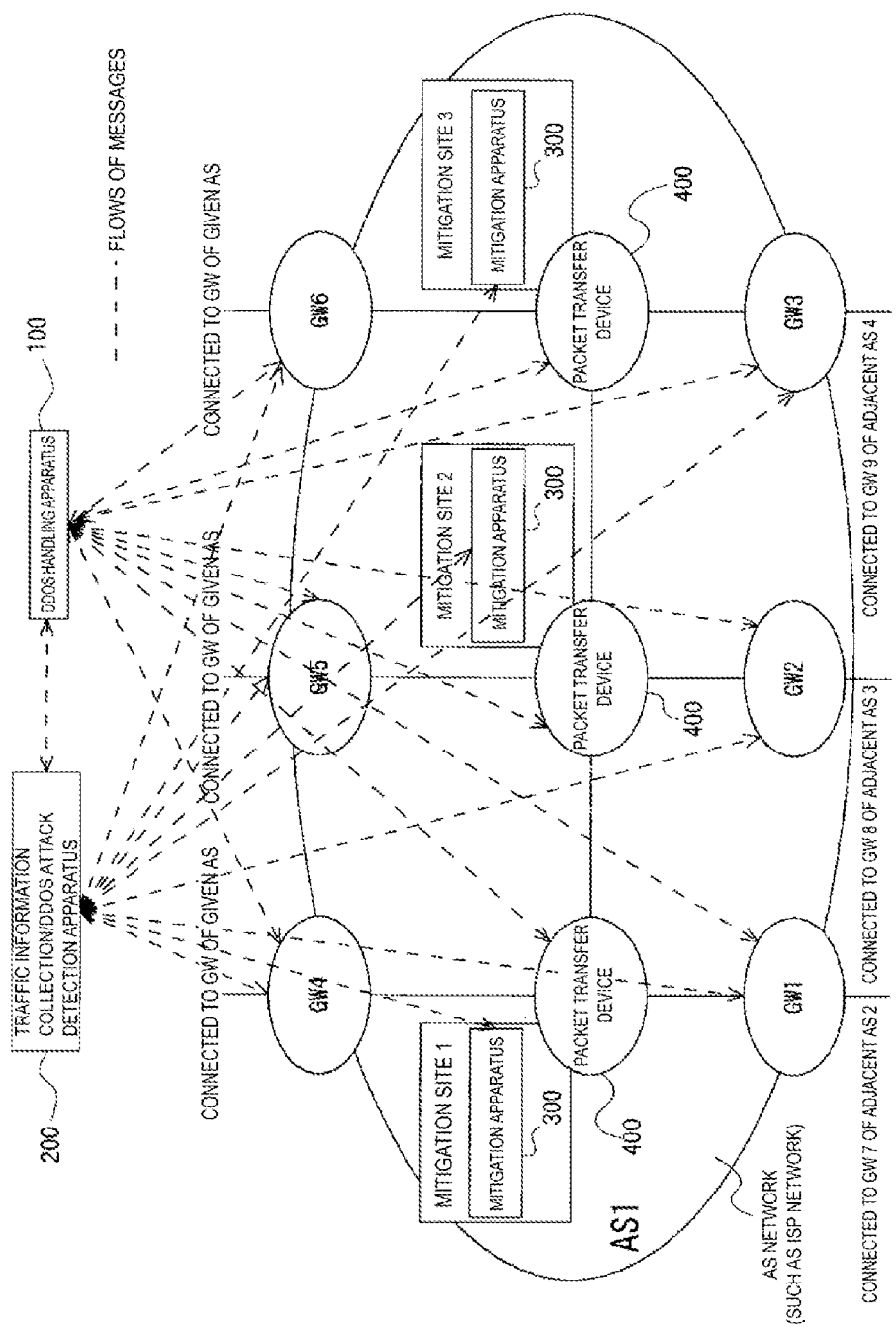
FIG. 2 is a configuration diagram of an AS (an example of AS1) having a DDoS handling apparatus according to the embodiment of the present disclosure.

As illustrated in FIG. 2, the AS has a plurality of mitigation sites in each of which at least one mitigation apparatus 300 is installed, a DDoS handling apparatus 100, a traffic information collection/DDoS attack detection apparatus 200, packet transfer devices 400, and GWs.

The mitigation apparatus 300 is an apparatus specialized in handling DDoS attacks like the apparatus described in Non Patent Literature 1 and can perform handling such as discriminating between attack and normal communications among communications to a certain destination and blocking only the attack communications. It is assumed that means for handling DDoS attacks includes not only such handling but also handling with a filtering function of a router or the like, manual handling, and the like.

The packet transfer devices 400 are network devices such as routers or layer 2 switches that are responsible for packet routing.

The GWs are network devices such as routers that are responsible for routing packets, similar to the packet transfer devices 400, but will be described separately as being located at boundaries with other ASs, customer networks, or the like.

The traffic information collection/DDoS attack detection apparatus 200 collects flow information (such as the communication amount and the flow direction (in/out) of each flow including a set of transmitting/receiving IP addresses, transmitting/receiving port numbers, a protocol number, or the like) from interfaces of GWs at regular intervals and analyzes the collected flow information to detect the occurrence of a DDoS attack to a specific destination. At a given time such as when an attack is detected, the traffic information collection/DDoS attack detection apparatus 200 transmits an attack detection message including an identifier for identifying a target-addressed communication in units of processing (such as a target IP address) to the DDoS handling apparatus 100 in its own AS. Here, a plurality of identifiers such as target IP addresses may be included in the attack detection message that the DDoS handling apparatus 100 is notified of when there are a plurality of target systems or when a target system has a plurality of identifiers such as IP addresses.

Further, the traffic information collection/DDoS attack detection apparatus 200 has functions of measuring the communication amount per unit of processing of a target-addressed communication that flows into each GW from each adjacent AS or the like (or flows out into an adjacent AS or the like from each GW), the maximum resource amount of the mitigation apparatus 300 of each site, an available resource amount of the mitigation apparatus of each site, or the like when a DDoS attack has occurred or at given times (at fixed time intervals or the like), storing these pieces of information in a traffic information table and a mitigation site information table, and notifying the DDoS handling apparatus 100 of the information on the traffic information table and the mitigation site information table.

FIG. 6 shows an example of the traffic information table. The traffic information table is, for example, present for each GW and includes a number uniquely identifying the GW, an area where the GW is installed (the area where a GW is installed and the area of a site used to handle a target-addressed communication that flows in through the GW are assumed to be the same in the present embodiment, and when the two areas differ, a table such as a GW to site correspondence information table is created in advance and association is performed), an identifier corresponding to a unit of processing (a destination IP address when units of processing are destination IP addresses), the AS number of an adjacent AS which is the source of inflow of a corresponding communication (in units of processing) (which is given no value in case of outflow), the AS number of an adjacent AS which is the destination of outflow of the corresponding communication (in units of processing) (which is given no value in case of inflow), and the communication amount per unit of processing of the corresponding communication flowing from each inflow source AS into the GW (or flowing from the GW into the outflow destination AS). The GW number and the area of the GW may be registered, for example, by an operator when the device is installed. An identifier corresponding to a unit of processing such as a target (destination) IP address, inflow source (destination) AS numbers, and the communication amount per unit of processing are appropriately updated at regular intervals or when traffic information is collected in response to a request from the DDoS handling apparatus 100. FIG. 8 shows an example of a GW to site correspondence information table which is created in advance when the area where each GW is installed and the area of a site used to handle a target-addressed communication that flows in through the GW differ as described above. The DDoS handling apparatus 100 is notified of the information on the GW to site correspondence information table together with the traffic information table.

FIG. 7 shows an example of the mitigation site information table. The mitigation site information table includes information of an identifier that allows unique identification of each site, the maximum resource amount of a mitigation apparatus 300 in the site, and the available resource amount thereof (which is obtained by subtracting a resource amount currently used for handling from the maximum resource amount). The site number and the maximum resource amount may be registered, for example, by the operator or the like when the site is installed.

The DDoS handling apparatus 100 is an apparatus that achieves resource load distribution between sites while preventing an increase in delay of target-addressed communications due to handling of DDoS attacks even when a plurality of IP addresses are attacked at the same time (a plurality of targets are handled at the same time).

The DDoS handling apparatus 100 has a function of communicating with the traffic information collection/DDoS attack detection apparatus 200 and receives an attack detection message or information such as an identifier for identifying a target-addressed communication in units of processing (for which a target (destination) IP address can be used when units of processing are target (destination) IP addresses and 5-tuple information can be used when units of processing are 5-tuple flows), the communication amount in units of processing of a target-addressed communication that flows into each GW from each adjacent AS (or an outflow into an adjacent AS from each GW), the maximum resource amount of the mitigation apparatus 300 of each site, and the available (remaining) resource amount thereof. The DDoS handling apparatus 100 also has a function of communicating with GWs and packet transfer devices 400 and a function of changing a communication route to a given destination via an attack handling setting unit 117 that will be described later.

Each of the DDoS handling apparatus 100 and the traffic information collection/DDoS attack detection apparatus 200 may be typically implemented by a server and includes, for example, a drive device, an auxiliary storage device, a memory device, a processor, an interface device, and a communication device which are interconnected via a bus. Various computer programs including a program for implementing various functions and processing of the DDoS handling apparatus which will be described later may be provided through a recording medium such as a compact disc-read only memory (CD-ROM), a digital versatile disc (DVD), or a flash memory. When the recording medium storing the program is set in the drive device, the program is installed on the auxiliary storage device from the recording medium via the drive device. However, it is not always necessary to install the program from the recording medium and the program may be downloaded from an external device via a network or the like. The auxiliary storage device stores the installed program and also stores necessary files, data, and the like. The memory device reads the program and data from the auxiliary storage device and stores them upon receiving an instruction to activate the program. The processor performs various functions and processing of the DDoS handling apparatus 100 or the traffic information collection/DDoS attack detection apparatus 200 which will be described later according to the program stored in the memory device and various data such as parameters necessary to execute the program. The interface device is used as a communication interface for connecting to a network or an external device. The communication device executes various communication processing for communicating with a network such as the Internet. However, the DDoS handling apparatus 100 and the traffic information collection/DDoS attack detection apparatus 200 are not limited to those with the hardware configurations described above and may be implemented by any other appropriate hardware configurations.

The configurations illustrated in the present embodiment are examples, and for example, the traffic information collection/DDoS attack detection apparatus 200 may be incorporated into the DDoS handling apparatus 100.

Figure 3:
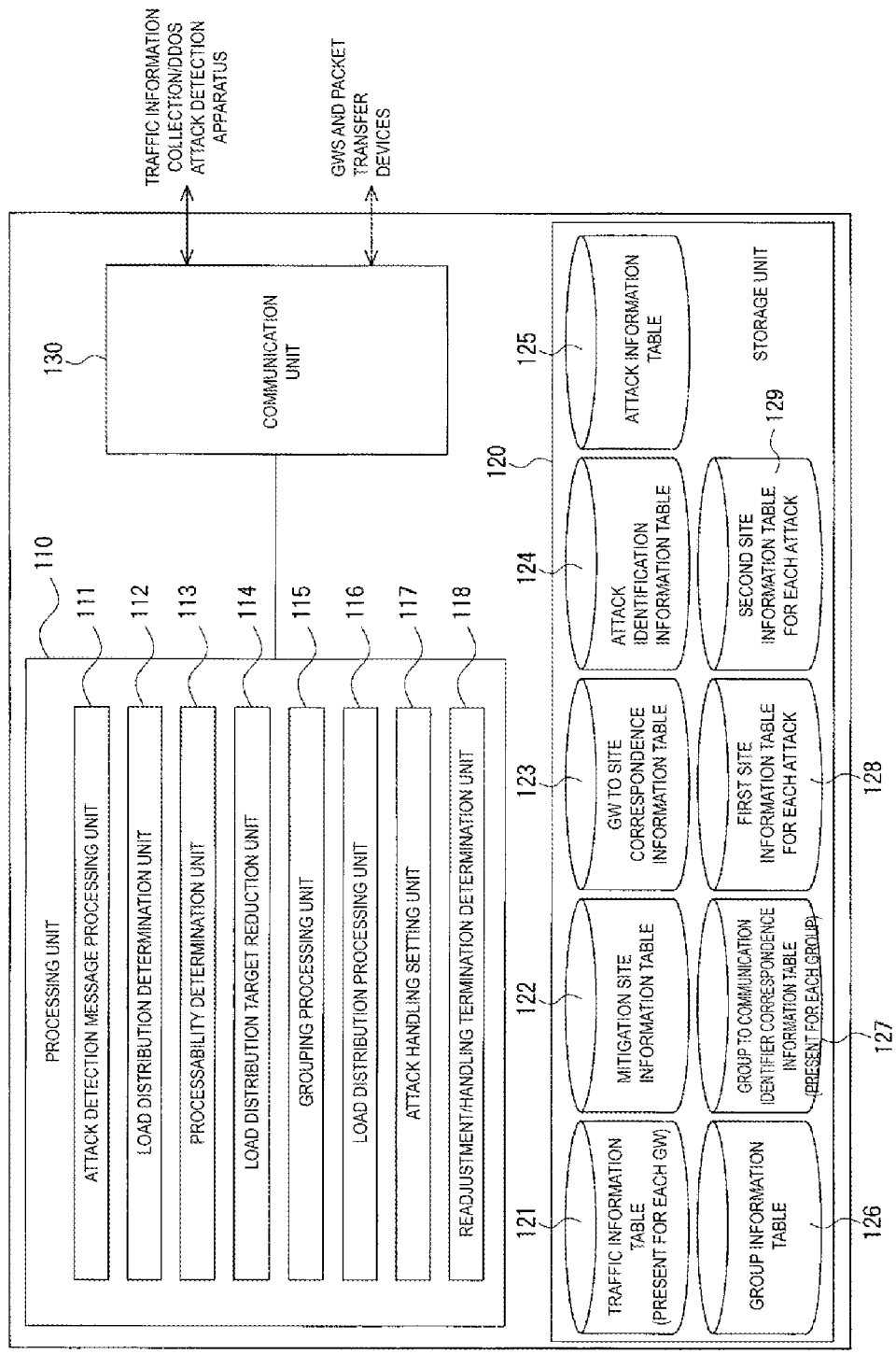
FIG. 3 is a functional configuration diagram of the DDoS handling apparatus according to the embodiment of the present disclosure.

Next, the DDoS handling apparatus 100 according to the embodiment of the present disclosure will be described in detail with reference to FIG. 3. FIG. 3 is a block diagram illustrating a configuration of the DDoS handling apparatus 100 according to the embodiment of the present disclosure.

As illustrated in FIG. 3, the DDoS handling apparatus 100 includes a processing unit 110, a storage unit 120, and a communication unit 130.

The processing unit 110 includes an attack detection message processing unit 111, a load distribution determination unit 112, a processability determination unit 113, a load distribution target reduction unit 114, a grouping processing unit 115, a load distribution processing unit 116, an attack handling setting unit 117, and a readjustment/handling termination determination unit 118.

The storage unit 120 includes a traffic information table 121, a mitigation site information table 122, a GW to site correspondence information table 123, an attack identification information table 124, an attack information table 125, and a group information table 126, a group to communication identifier correspondence information table 127, a first site information table 128 for each attack, and a second site information table 129 for each attack.

The DDoS handling apparatus 100 receives the traffic information, the mitigation site information, and the GW to site correspondence information, of which the traffic information collection/DDoS attack detection apparatus 200 has notified at a given time, through a data receiving unit (not shown) and stores each of the received pieces of information in a corresponding one of the traffic information table 121, the mitigation site information table 122, or the GW to site correspondence information table 123. The data structures of the traffic information table 121, the mitigation site information table 122, and the GW to site correspondence information table 123 are the same as those of the tables in the traffic information collection/DDoS attack detection apparatus 200, examples of which are shown in FIGS. 6 to 8.

Figure 4:
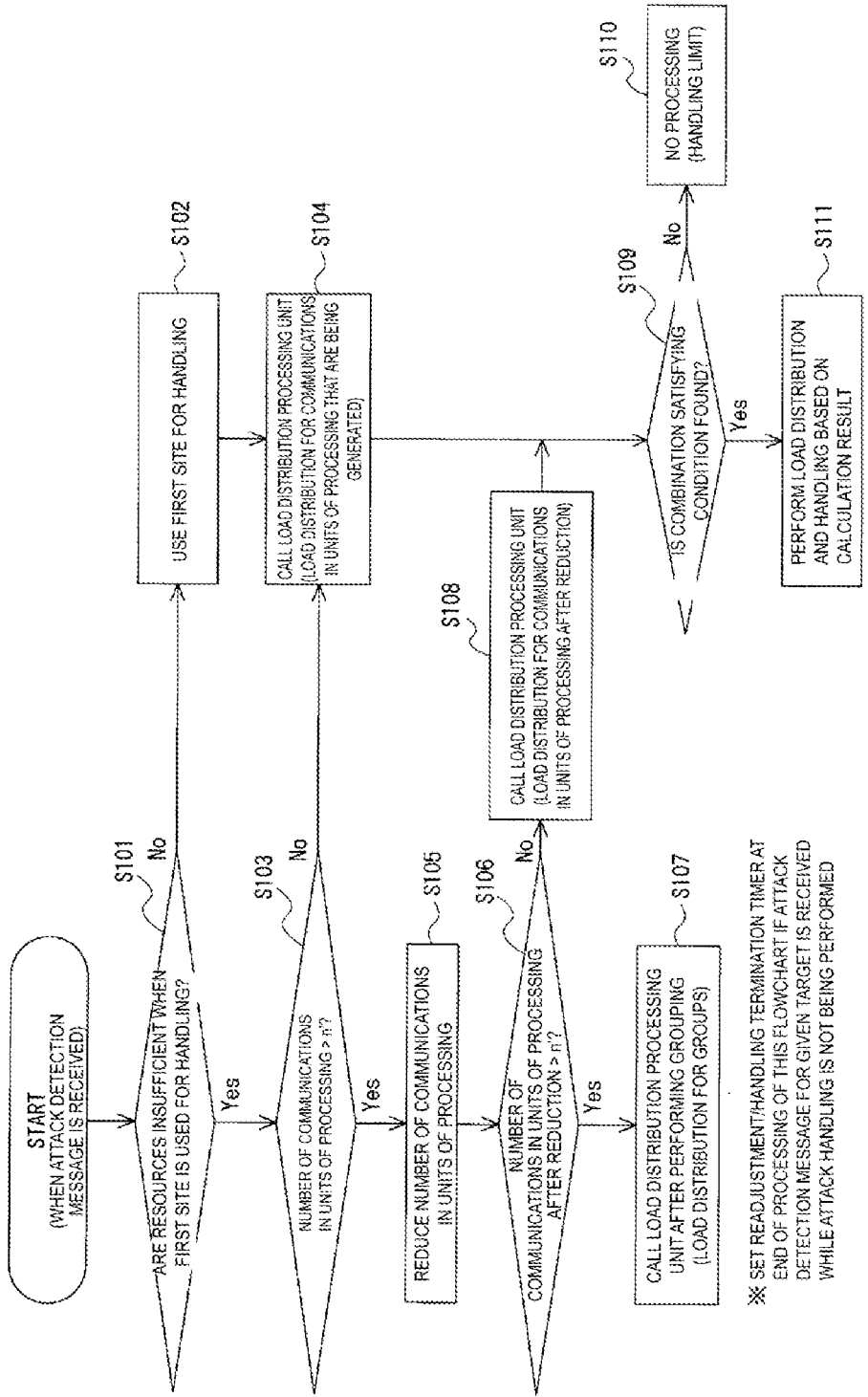
FIG. 4 is a simplified flowchart illustrating an operation of the DDoS handling apparatus according to the embodiment of the present disclosure.

The functions of the components of the processing unit 110 will be described below with reference to a flowchart of FIG. 4. FIG. 4 is a simplified flowchart of the operation of the DDoS handling apparatus 100 upon receiving an attack detection message when load distribution target reduction and grouping processing are used together.

The attack detection message processing unit 111 stores identifiers for identifying target-addressed communications in units of processing (for example, target IP addresses or 5-tuple information) in the attack identification information table 124 in the processing upon receiving an attack detection message from the traffic information collection/DDoS attack detection apparatus 200. FIG. 9 shows an example of the attack identification information table 124.

Based on the traffic information table 121 for each GW and received identifiers such as target IP addresses, the attack detection message processing unit 111 determines how much and from a GW in which area each target-addressed communication (in units of processing) flows in the own AS and from a GW in which area it flows out into another AS, and registers, in the attack information table 125, information on the identifiers in units of processing (such as target IP addresses), current handling states (values of which are NULL by default), exclusion flags (values of which are False by default), the areas of entrance (which are the areas where GWs are through which target-addressed communications (in units of processing) flow in the own AS from another AS or the like, with the assumption that mitigation sites are installed in units of the areas), the amount of target-addressed communications (in units of processing) that flow in through GWs of entrance, and the areas of exit (which are the areas where GWs are installed through which target-addressed communications (in units of processing) flow out of the own AS into another AS or the like). FIG. 10 shows an example of the attack information table 125.

Thereafter, the attack detection message processing unit 111 activates the load distribution determination unit 112 to determine whether load distribution is necessary.

The load distribution determination unit 112 is a processing unit that determines whether each first site (a site close to an entrance in the present embodiment) that has been preset to be used by default has sufficient resources to handle target-addressed communications (in units of processing) that flow in the own AS and handles the target-addressed communications using the first site if the first site has sufficient resources, and calls the processability determination unit 113 if the first site has insufficient resources (see steps S101 and S102 in FIG. 4).

Specifically, the load distribution determination unit 112 is a processing unit that determines whether a site corresponding to an entrance through which target-addressed communications in units of processing currently flow in (a site in the area of the entrance in the present embodiment) has sufficient resources when the amounts of target-addressed communications are brought to the site based on the attack information table 125, the GW to site correspondence information table 123, and the mitigation site information table 122. For example, the load distribution determination unit 112 compares the sum of the amounts of target-addressed communications flowing in through each GW in North America with the available resource amount of the site 1 in North America and determines that the site 1 in North America has sufficient resources when the available resource amount is larger.

If all sites have sufficient resources, the load distribution determination unit 112 sets the current handling states of the target IP addresses (units of processing) in the attack information table 125 to "1" indicating the first site and notifies the attack handling setting unit 117 of their identifiers corresponding to units of processing such as target IP addresses and the handling state number (=1) to change the routes of the target-addressed communications (units of processing) such that their routes pass through the first site (see step S102 in FIG. 4). On the other hand, if there are insufficient resources, the load distribution determination unit 112 calls the processability determination unit 113. The load distribution determination unit 112 also sets a timer that calls the readjustment/handling termination determination unit 118 at regular intervals after receiving the first attack detection message.

The processability determination unit 113 is a processing unit that is called by the load distribution determination unit 112 and determines whether the number of target-addressed communications (units of processing) exceeds the "number of communications in units of processing which can be processed simultaneously (n')" when it is desired to perform load distribution within a desired time (see step S103 in FIG. 4). Here, the value of n' is preset by the operator or the like based on the performance of a computer for implementing the operations of the technique of the present disclosure, service specifications as to the time within which it is desired to perform the load distribution/attack handling processing according to the present disclosure, and the like. Moreover, based on the information of identifiers in the attack information table 125, the number of target-addressed communications (units of processing) is calculated (which matches the number of records of the table 125 when the table is constructed as in the present embodiment).

If the number of target-addressed communications (units of processing) exceeds the "number of communications in units of processing that can be processed simultaneously (n')," the processability determination unit 113 determines that the processing is not possible and calls the load distribution target reduction unit 114 or calls the grouping processing unit 115 directly without passing through the load distribution target reduction unit 114. Here, it is assumed that one of the load distribution target reduction unit 114 and the grouping processing unit 115 is used or both are used in combination, and which of the load distribution target reduction unit 114 and the grouping processing unit 115 is to be used or the like is preset, for example, by the operator. When the processability determination unit 113 has determined that the processing is possible, the load distribution processing unit 116 is called (see step S104 in FIG. 4).

The load distribution target reduction unit 114 is a processing unit that reduces the number of communications in units of processing that are targets of load distribution (see step S105 in FIG. 4). Logics to reduce the number of communications include (1) exclusion, from the targets of load distribution, of target-addressed communications (units of processing) that can only be transferred to a site with insufficient resources and (2) exclusion, from the targets of load distribution, of target-addressed communications (units of processing) with small communication amounts, which has small load distribution effects when sites used for handling are switched.

In the logic (1), the load distribution target reduction unit 114 refers to the traffic information table 121 to acquire, for each target-addressed communication (unit of processing), the GW number of a GW through which the target-addressed communication flows out (that is, the exit GW number) and refers to the GW to site correspondence information table 123 using the acquired GW number to acquire a site number corresponding to the GW (that is, the exit site number). The load distribution target reduction unit 114 excludes each target-addressed communication (unit of processing) from the targets of load distribution when the exit site number of the target-addressed communication (unit of processing) matches a site number resources of which have been determined to be insufficient by the load distribution determination unit 112. Here, an exclusion flag of the target-addressed communication (unit of processing) in the attack information table 125 is set to True.

The logic (2) focuses on the communication amount of each target-addressed communication (unit of processing) to determine whether to exclude the target-addressed communication from the targets of load distribution. Specific methods that are conceivable here include, for example, a method in which a threshold x (for example, 100 Mbps) of the communication amount is defined and target-addressed communications communication amounts of which are equal to or less than the threshold are excluded (exclusion flags thereof are set to True), and a method in which all target-addressed communications (units of processing) are sorted in order of communication amount and those other than the top a % in terms of the communication amount are excluded.

Both of the logics (1) and (2) may be implemented in combination or only one may be implemented.

In addition, the load distribution target reduction unit 114 determines whether the number of communications in units of processing which are targets of load distribution, the number of which has been reduced through its own processing, exceeds the "number of communications in units of processing that can be processed simultaneously (n')" (see step S106 in FIG. 4) and calls the grouping processing unit 115 (see step S107 in FIG. 4) if this number of communications exceeds n'. On the other hand, if the reduced number of communications in units of processing which are targets of load distribution does not exceed n', the load distribution target reduction unit 114 calls the load distribution processing unit 116 (see step S108 in FIG. 4). The values of exclusion flags of target-addressed communications (units of processing) in the attack information table 125 may be initialized to False each time the load distribution target reduction unit 114 is called.

The grouping processing unit 115 is a processing unit that groups target-addressed communications in units of processing that are targets of load distribution into several groups (see step S107 in FIG. 4). Here, the number of groups is set to be equal to or less than the "number of communications in units of processing that can be processed simultaneously (n')" and the load distribution processing unit 116 which will be described later performs calculation for load distribution in units of groups, thereby enabling resource load distribution between sites in a realistic time even if the number of target-addressed communications in units of processing increases. There are the following three types of grouping methods, which can be switched and used according to the judgment of the operator or the like. In the grouping processing described below, the load distribution target reduction unit 114 described above also excludes target-addressed communications (units of processing) exclusion flags of which are set to True from targets of the grouping processing.

In grouping based on any of the methods, the grouping processing unit 115 adds grouping-related information to the group information table 126 and the group to communication identifier correspondence information table 127. FIGS. 11 and 12 show examples of the group information table 126 and the group to communication identifier correspondence information table 127, respectively. The grouping processing unit 115 calls the load distribution processing unit 116 after performing grouping based on any of the methods (see step S107 in FIG. 4).

Method 1: In a logic regarding the number of groups to be created, groups are created one by one for each combination of "exit site+current handling state (entrance or exit)" (records are created in the group information table 126). In a logic to add each target-addressed communication (unit of processing) to a group, an identifier such as a target IP address of each target-addressed communication (unit of processing) is added to a group that matches information of the target-addressed communication (is added to a group to communication identifier correspondence information table 127 for a group corresponding to the target-addressed communication).

For example, when a target-addressed communication is such that the "exit site is 1 and the current handling state is 1 (entrance)," the target-addressed communication is added to a group for "exit site is 1 and current handling state is 1." If addition of a target-addressed communication (unit of processing) to a group causes the communication amount of the group to exceed the upper limit thereof, another group of the same combination of "exit site+current handling state" is created (a record of the group information table 126 is created) and the target-addressed communication (unit of processing) is added to the created group. Here, the upper limit of the communication amount of each group is set to the value of the available resource amount of the exit site of the group, so that it is possible to eliminate immovable groups in load distribution processing that will be described later.

Method 2: In a logic regarding groups to be created, groups are created (records of the group information table 126 are created) up to n' groups, the maximum number of groups, based on the proportion of the number of target-addressed communications in units of processing belonging to groups in each combination of "exit site+current handling state (entrance or exit)." In a specific procedure, the number of target-addressed communications (units of processing) corresponding to each combination of "exit site+current handling state" is counted, and groups, the number of which is equal to "n' (the number of target-addressed communications (units of processing) of groups corresponding to the combination/the total number of target-addressed communications (units of processing))," are created for each combination of "exit site+current handling state."

For example, if n' is equal to 20 and the respective numbers of target-addressed communications (units of processing) corresponding to "1 and entrance," "1 and exit," "2 and entrance," and "2 and exit" are 20, 10, 20, and 0 respectively when the combination of "exit site+current handling state" is represented by "exit site number and current handling state," the respective numbers of created groups of "1 and entrance," "1 and exit," "2 and entrance," and "2 and exit" are 8 (=20×(20/50)), 4 (=20×(10/50)), 8, and 0, respectively. If the result is not an integer, it is rounded to an integer. Here, if the total number of groups is larger than n', it is reduced by a given number of groups until it becomes n'. If the total number of groups is smaller than n', a given number of groups are increased until it becomes n'. The method of performing this processing is optional. For example, it is assumed that a method in which the number of groups is reduced one by one for each combination of "exit site+current handling state" in order from a combination with the largest number of groups or in a random order (or is increased in order from a combination with the smallest number of groups or in a random order) is applied. By creating up to n' groups where n' is the upper limit of the number of groups that can be calculated in a realistic time, it is possible to increase the number of combinations for handling of groups at the first and second sites when distributing a resource load and thus to expect improvement in load distribution performance.

In addition to matching of "exit site+current handling state", as a logic to add a target-addressed communication (unit of processing) to each created group (register it in the group to communication identifier correspondence information table 127), target-addressed communications (units of processing) are added to groups such that the numbers of target-addressed communications (units of processing) of the groups are as equal as possible (when a target-addressed communication (unit of processing) which does not yet belong to any group is to be added, a group with the matching condition and a small number of target-addressed communications is selected and the target-addressed communication is added to the selected group). Alternatively, target-addressed communications are added to groups such that the communication amounts of the groups are as equal as possible (when a target-addressed communication (unit of processing) which does not yet belong to any group is to be added, a group with a small communication amount is selected and the target-addressed communication is added to the selected group). If addition of a target-addressed communication (unit of processing) that does not yet belong to any group to a group causes the communication amount of the group to exceed the upper limit of the communication amount of each group as in the method 1, adding the target-addressed communication (unit of processing) to the next candidate group is attempted, and if it cannot be added to any candidate, an exclusion flag for the target-addressed communication (unit of processing) in the attack information table 125 is set to True and the target-addressed communication is not added to any group.

Method 3: The logic to create groups is the same as the method 2. In a logic to add a target-addressed communication (unit of processing) to each group (register it in the group to communication identifier correspondence information table 127), all target-addressed communications (units of processing) are sorted in descending order of communication amount and are each added to a group with the matching condition in order from a target addressed communication with the largest communication amount. Here, an exclusion flag in the attack information table 125 for a target-addressed communication which causes the communication amount of a group to exceed the upper limit when added to the group is set to True and the target-addressed communication is not added to the group. By doing so, the communication amounts of groups can be made different and it is possible to expect improvement in resource load distribution performance.

The values of the group information table 126 and the values of the group to communication identifier correspondence information table 127 may be initialized each time the grouping processing unit 115 is called. (That is, groups may be recreated each time the grouping processing is called). Further, even if the number "n" of target-addressed communications in units of processing is large, this grouping processing and the search for a combination for load distribution in units of groups limit time complexity of the load distribution processing unit 116 to $O((n')^2)$ in the worst case.

The load distribution processing unit 116 extracts, for each target-addressed communication (unit of processing) or for each group, a first site that has been set to be used for handling by default (a site close to the entrance of each target-addressed communication (unit of processing) in the present embodiment) and a second site capable of performing transfer with an equivalent delay (a site close to the exit of each target-addressed communication (unit of processing) in the present embodiment) and searches for a combination indicating, for each target-addressed communication in units of processing or for each group, which of a first site or a second site is to be used to handle the target-addressed communication or the group such that the shortage of resources between sites can be resolved (resources between sites can be distributed).

First, a method of extracting the first and second sites by the load distribution processing unit 116 will be described. As shown in FIG. 13, the first site information table 128 includes an identifier corresponding to a unit of processing such as a target IP address, the areas of entrance, site numbers of sites present in (corresponding to) the areas, and a resource amount required to handle the target-addressed communication (unit of processing). For each target-addressed communication (unit of processing), the load distribution processing unit 116 copies the values of area information in the entrance information of the attack information table 125 and the communication amount per unit of processing of the target-addressed communication as they were and registers them as values of the areas of entrance and the required resource amount. Site numbers are registered by referring to the GW to site correspondence information table 123.

Further, for each target-addressed communication (unit of processing), the load distribution processing unit 116 extracts GW information and communication amount information of the exit by referring to a table for a GW in the traffic information table 121 which includes an identifier of the communication (unit of processing) and in which the AS number of an adjacent AS which is the destination of outflow is set, and registers the extracted GW information and communication amount information of the exit in the second site information table 129 for each attack by comparing the extracted information with the GW to site correspondence information table 123. The information in the second site information table 129 for each attack includes an identifier corresponding to a unit of processing such as a target IP address, information of an exit area, an exit site number, and a resource amount required to handle the attack. FIG. 14 shows an example of the second site information table 129 for each attack. Here, the sum of the values of communication amounts in units of processing of corresponding target-addressed communications that flow in from the areas is registered as the required resource amount by referring to the attack information table 125. For example, if communications flow in from North America, Europe, and Asia at 10 Gbps each, the sum, 30 Gbps, is registered as a required resource amount.

When the load distribution processing unit 116 is called by the grouping processing unit 115 and performs processing in units of groups, the load distribution processing unit 116 refers to the group to communication identifier correspondence information table 127 to extract identifiers such as target IP addresses included in each group. Thereafter, the load distribution processing unit 116 calculates the sum of resource amounts required to handle attacks corresponding to a given number of the extracted identifiers in the first site information table 128 and registers the calculated sum as information of a resource amount required for each site in information when the first site is used in the group information table 126. The load distribution processing unit 116 also calculates the sum of resource amounts required to handle attacks corresponding to a given number of the extracted identifiers in the second site information table 129 and registers the calculated sum as information of a resource amount required for each site in information when the second site is used in the group information table 126.

For example, when units of processing are target IP addresses and the group 1 includes IP1 and IP2, the sum of the value of the resource amount required for the site number 1 in a record of IP1 in the first site information table 128 and the value of the resource amount required for the site number 1 in a record of IP2 in the first site information table 128 is registered as the resource amount required for the site number 1 in the information when the first site is used in the group information table 126. Similarly, by referring to the second site information table 129, the sum of resource amounts required for a site number for IPs included in each group is registered in the information when the second site is used.

Next, search processing for determining which of a first site or a second site is to be used to handle each target-addressed communication (unit of processing) or each group in order to resolve the shortage of resources (distribute load) between sites will be described. The load distribution processing unit 116 performs combination search for target-addressed communications (units of processing) when it has been called by the processability determination unit 113 or by the load distribution target reduction unit 114, and performs combination search in units of groups when it has been called by the grouping processing unit 115.

While an objective function for optimization for this load distribution is optional, it can be assumed that, for example, the following objective functions are used.

Objective function 1: ensuring that the resource usage rates of sites are as even as possible in order to further increase accommodation efficiency, in addition to resolving the shortage of resources Objective function 2: minimizing the number of target-addressed communications routes of which need to be changed from the current routes, taking into consideration the influence of route change upon communication, in addition to resolving the shortage of resources.

The case of searching for a combination that enables handling such that the resource amount of the mitigation apparatus 300 in each site does not exceed the maximum resource amount thereof as in Non Patent Literature 2 will be described below.

First, combination search in units of target-addressed communications (units of processing) will be described. The load distribution processing unit 116 compares the sum of resource amounts used in each site with the maximum resource amount of the site in the case where a second site is used for one of all target-addressed communications (units of processing) and a first site is used for the others, based on the first site information table 128, the second site information table 129, the GW to site correspondence information table 123, and the mitigation site information table 122, and searches for a combination where the sum of resource amounts is equal to or less than the maximum resource amount for every site.

If no combination satisfying the condition is found, the load distribution processing unit 116 performs the search sequentially in the case where the second site is used for two of all target-addressed communications (units of processing) and the first site is used for the others, in the case where the second site is used for three and the first site is used for the others, and the like, and terminates the search when a combination where the sum of resource amounts is equal to or less than the maximum resource amount for every site is found.

If no combination satisfying the condition is found by the end, this is a handling limit and the processing is terminated without performing any processing (see steps S109 and S110 in FIG. 4). This means that "attacks that are currently handled using first or second sites remain handled using the same and new generated attacks will not be brought to sites."

Thereafter, the load distribution processing unit 116 updates the current handling state of each target-addressed communication (unit of processing) in the attack information table 125 based on the search result. Here, the load distribution processing unit 116 registers "1" when a first site is used and "2" when a second site is used. For a target-addressed communication (unit of processing) which is subjected to route change or is newly handled (newly brought to a mitigation site), the load distribution processing unit 116 notifies the attack handling setting unit 117 of an identifier corresponding to a unit of processing (such as a target IP address) and the value of the handling state of the target-addressed communication while calling the attack handling setting unit 117.

Next, combination search in units of groups will be described. The load distribution processing unit 116 compares the sum of resource amounts required for each site with the maximum resource amount of the site in the case where a second site is used for one of all groups and a first site is used for the others, based on the group information table 126 and the mitigation site information table 122, and searches for a combination where the sum of resource amounts is equal to or less than the maximum resource amount for every site.

If no combination satisfying the condition is found, the load distribution processing unit 116 performs the search sequentially in the case where second site is used for two of all groups and the first site is used for the others, in the case where second site is used for three and the first site is used for the others, and the like, and terminates the search when a combination where the sum of resource amounts is equal to or less than the maximum resource amount for every site is found.

If no combination satisfying the condition is found by the end, this is a handling limit and the processing is terminated without performing any processing (see steps S109 and S110 in FIG. 4). This means that "attacks that are currently handled using first or second sites remain handled using the same and new generated attacks will not be brought to sites."

Thereafter, the load distribution processing unit 116 acquires, for each group, identifiers (such as target IP addresses) corresponding to units of processing belonging to the group from the group to communication identifier correspondence information table 127 and updates the current handling state of each target-addressed communication (unit of processing) in the attack information table 125 based on the search result. For a target-addressed communication (unit of processing) which is subjected to route change or is newly handled (newly brought to a mitigation site), the load distribution processing unit 116 notifies the attack handling setting unit 117 of an identifier corresponding to a unit of processing (such as a target IP address) and the site number (the value of the handling state) of the target-addressed communication while calling the attack handling setting unit 117.

Based on an identifier corresponding to a unit of processing (such as a target IP address) and a handling state number of a target-addressed communication, of which the load distribution determination unit 112 or the load distribution processing unit 116 has notified, and a site number for the corresponding communication in a site information table indicated by the handling state number (the first site information table 128 or the second site information table 129), the attack handling setting unit 117 performs route setting on each GW and the packet transfer device 400 in the own AS for transferring the target-addressed communication (unit of processing) to a desired mitigation site (see step S111 in FIG. 4).

The readjustment/handling termination determination unit 118 is called by a timer at regular intervals and has a function of readjustment (re-execution of resource load distribution)/handling termination according to an increase/decrease in the amount of a target-addressed communication (unit of processing). The readjustment/handling termination determination unit 118 updates information regarding currently occurring target-addressed communications (units of processing) in the attack information table 125 based on the traffic information table 121 for each GW. Here, it is assumed that the update for a given target-addressed communication (unit of processing) is an increase or decrease in the value of the amount of the target-addressed communication (unit of processing).

Further, the readjustment/handling termination determination unit 118 checks the available resource amount in the mitigation site information table 122 and performs processing of calling the load distribution processing unit 116, for example, when the available resource amount is less than a preset threshold. This is a mechanism for dealing with the shortage of resources due to an increase in the amount of currently occurring attacks.

Further, if an amount of a target-addressed communication (the sum of the communication amounts in each of a plurality of areas when the plurality of areas serves as entrances) is less than, for example, a preset threshold, the readjustment/handling termination determination unit 118 determines that attacks have ended and terminates handling of attacks. In a specific termination process, the readjustment/handling termination determination unit 118 deletes an identifier corresponding to a unit of processing (such as a target IP address) whose handling is to be terminated from the attack identification information table 124, the attack information table 125, the first site information table 128 for each attack, the second site information table 129 for each attack, and the group to communication identifier correspondence information table 127 and changes the route of the target-addressed communication handling of which is to be terminated to a normal route via the attack handling setting unit 117, thereby stopping the act of bringing the communication to a mitigation site.

Figure 5:
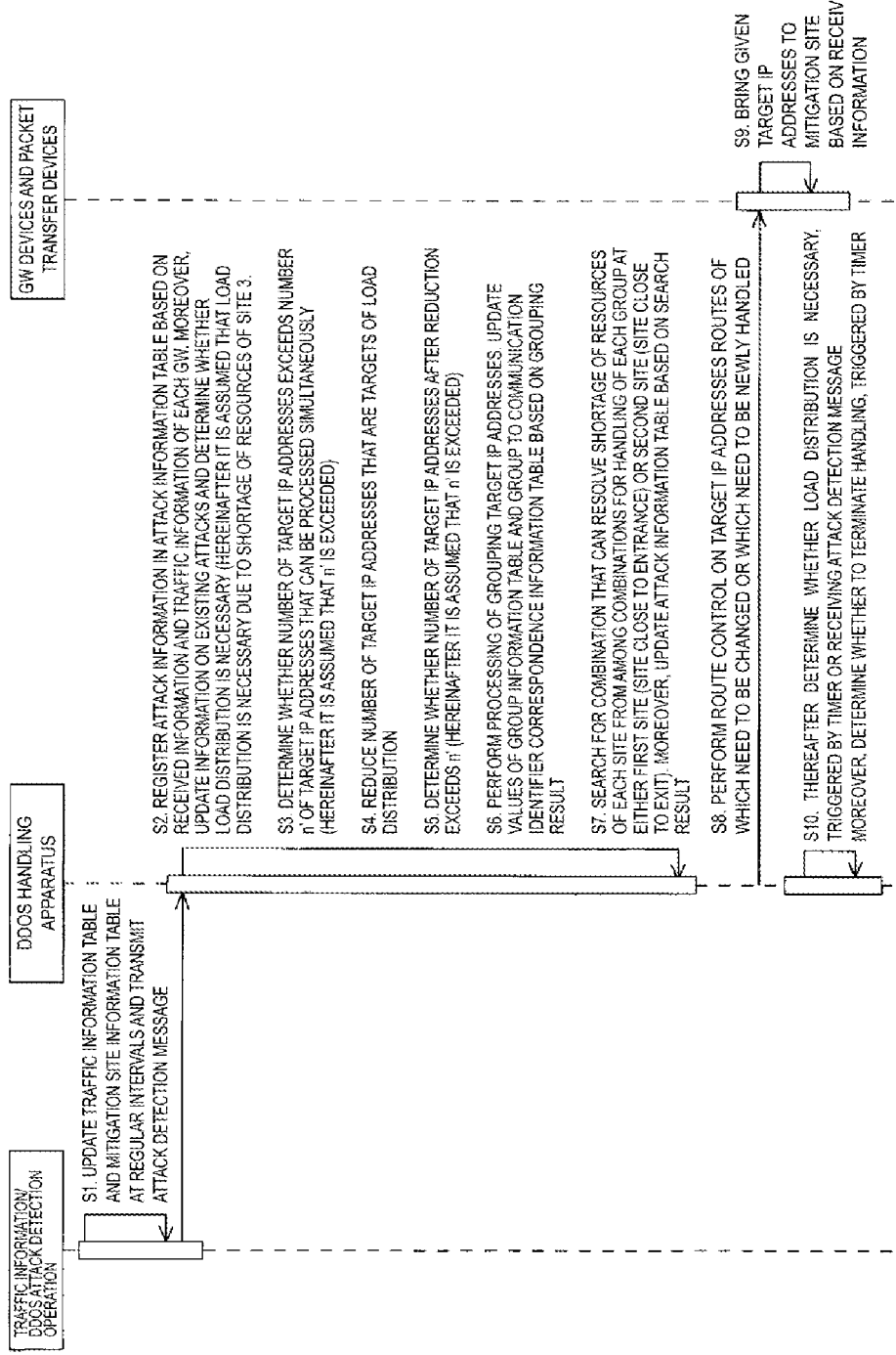
FIG. 5 illustrates an example of a DDoS attack handling procedure according to the embodiment of the present disclosure.

Next, an example of a DDoS attack handling procedure according to the embodiment of the present disclosure will be described with reference to FIG. 5. FIG. 5 is a sequence diagram illustrating a DDoS attack handling procedure according to the embodiment of the present disclosure. Here, it is assumed that the AS1 provides each of the AS2, the AS3, and the AS4 with a DDoS attack detection/handling service for DDoS attacks targeting the AS2, the AS3, and the AS4. A description will be given to the case where a DDoS attack (with a communication amount of 20 Gbps) that is addressed to the system 31 in the AS3 and originates from Asia newly occurs and is handled in a state where DDoS attacks originating from Asia and targeting systems 1 to 20 in the AS2 and systems 21 to 30 in the AS3 (with communication amounts of 3 Gbps addressed to each of the systems 1 to 10, 0.5 Gbps addressed to each of the systems 11 to 20, and 1 Gbps addressed to each of the systems 21 to 30) occur and are being handled using a first site (a site close to the entrance). The AS1 has mitigation sites in the three areas and the maximum resource amount of the mitigation apparatus 300 of each site is 60 Gbps. It is also assumed that units of processing are destination (target) IP addresses.

Step S1 The traffic information collection/DDoS attack detection apparatus 200 collects flow information from each GW, stores the communication amount of each destination IP address in the traffic information table, and notifies the DDoS handling apparatus 100 of the traffic information at regular intervals. The traffic information collection/DDoS attack detection apparatus 200 also collects the available resource amount from the mitigation apparatus 300 in each site, stores the collected information in the mitigation site information table, and notifies the DDoS handling apparatus 100 of the mitigation site information at regular intervals. The traffic information collection/DDoS attack detection apparatus 200 also detects an attack on a target system 31 in the AS3 by analyzing traffic information of flows or the like (for example, detecting an attack when the communication amount of a specific destination is equal to or larger than a preset threshold) and transmits an attack detection message including the IP address of the target system 31 to the DDoS handling apparatus 100.

Step S2 The DDoS handling apparatus 100 stores the target IP address included in the received message in the attack identification information table 124. Based on the traffic information table 121 for each GW and the received target IP address, the DDoS handling apparatus 100 determines how much and from a GW in which area a communication addressed to the target IP address flows in the own AS and from a GW in which area it flows out into another AS, and registers, in the attack information table 125, information on the target IP address, the current handling state (value of which is NULL by default), the area of the entrance, the amount of a target-addressed communication that flows in through the entrance (the sum of the amounts of target-addressed communications when there are a plurality of entrance GWs in the area), and the area of the exit.

Further, based on the attack information table 125, the GW to site correspondence information table 123, and the mitigation site information table 122, the DDoS handling apparatus 100 determines whether a site corresponding to an entrance (area) through which a target-addressed communication currently flows in has sufficient resources when the amount of the target-addressed communication is brought to the site and starts load distribution processing when the site has insufficient resources. Here, the amount of target-addressed communication flowing in from Asia (=20 Gbps) is larger than the available resource amount of the site 3 (=15 Gbps) and thus the DDoS handling apparatus 100 starts the load distribution processing because the resources of the site 3 are insufficient.

Step S3
The DDoS handling apparatus 100 determines whether the number of IP addresses that need to be handled exceeds the number n' of IPs that can be processed simultaneously (the IP addresses cannot be processed). Here, n' is equal to ten, which is smaller than the number of IP addresses 31 that need to be handled, and thus the DDoS handling apparatus 100 determines that the addresses 31 that need to be handled cannot be processed.

Step S4
The DDoS handling apparatus 100 reduces the number of target IP addresses that are targets of load distribution using any of the logics described above. For example, if communications with a communication amount of 0.5 Gbps or less are not targets of load distribution according to the logic (2), the IP addresses of the systems 11 to 20 are excluded from the targets of load distribution. Here, exclusion flags in the attack information table 125 are set to TRUE for the target IP addresses that are not targets of load distribution.

Step S5
The DDoS handling apparatus 100 determines whether the number of target IP addresses after the reduction exceeds n' (cannot be processed). Here, the DDoS handling apparatus 100 determines that IPs after the exclusion cannot be processed because the number of IPs after the exclusion is 21 and exceeds n', which is equal to ten.

Step S6
The DDoS handling apparatus 100 refers to the attack information table 125 and performs grouping processing based on any of the methods described above for target IP addresses exclusion flags of which are not TRUE.

For example, in the case of the method 2, the number of groups to be created is determined as follows. The number of IPs of "exit site=1 and current handling state=1" is 10 and the number of IPs of "exit site=2 and current handling state=1" is 11 (when an IP the current handling state of which is NULL is treated as that having a handling state of 1) and thus 5 groups of the former condition are created (10×10/21≅5) and 5 groups of the latter are created (10×11/21≅5). When IP addresses are added to groups such that the communication amounts of the groups are equal, first, the IP address of the target system 1 is added to a first group of "exit site=1 and current handling state=1" and then the IP address of the target system 2 is added to a second group of "exit site=1 and current handling state=1," and the like. In this manner, IP addresses are added to groups one by one in ascending order of attack number such that the amounts of communications in groups are equal. Moreover, IP addresses are added to groups of "exit site=1 and current handling state=1," for example, such that the sum of the amounts of communications in the groups does not exceed the available resource amount "60" of the site 1. IP addresses are added to another group of "exit site=1 and current handling state=1" if the sum of the amounts of communications in the groups exceeds the available resource amount "60" of the site 1. The exclusion flag of an IP address, which can be added to no group, is set to TRUE and the IP address is not added to any group. Similarly, IP addresses are added to groups of "exit site=2 and current handling state=1" such that the sum of the amounts of communications in the groups does not exceed the available resource amount "60" of the site 2. IP addresses are added to another group of "exit site=1 and current handling state=1" if the sum of the amounts of communications in the groups exceeds the available resource amount "60" of the site 2. The exclusion flag of an IP address, which can be added to no group, is set to TRUE and the IP address is not added to any group.

The DDoS handling apparatus 100 registers a given number of groups in the group information table 126 based on the result of group creation and the addition of IP addresses to each group as described above and registers, for each group, target IP addresses belonging to the group in the group to communication identifier correspondence information table 127.

Step S7

The DDoS handling apparatus 100 registers values in the first site information table 128 for each attack and the second site information table 129 for each attack based on the attack information table 125 and the GW to site correspondence information table 123. Also, the DDoS handling apparatus 100 registers information when the first site is used and information when the second site is used for each group of the group information table 126 based on the group to communication identifier correspondence information table 127, the first site information table 128, and the second site information table 129. Further, the DDoS handling apparatus 100 searches for a combination that can resolve the shortage of resources of each site among combinations for handling of each group at either a first site (a site close to an entrance) or a second site (a site close to an exit). Further, the DDoS handling apparatus 100 updates the current handling state in the attack information table 125 for each target IP address based on the search result.

Step S8

The DDoS handling apparatus 100 performs route setting on the GWs or the packet transfer devices 400 to bring a communication addressed to each target IP address to the mitigation apparatus 300 through a desired route to handle the communication.

Step S9

The GWs or the packet transfer devices 400 bring given target IP addresses to the mitigation site.

Step S10

Thereafter, triggered by a timer or receiving an attack detection message, the DDoS handling apparatus 100 again determines whether load distribution is necessary. In addition, triggered by a timer, the DDoS handling apparatus 100 determines whether to terminate handling.

According to the present embodiment, when the load distribution processing unit 116 performs search processing in units of target-addressed communications (units of processing), the number of target-addressed communications (units of processing) that are targets of the processing has already been reduced by the load distribution target reduction unit 114 as described above. This reduces a processing load of the load distribution processing unit 116. In addition, the grouping processing unit 115 groups target-addressed communications and thus the load distribution processing unit 116 can perform the search processing for each group. This also reduces a processing load of the load distribution processing unit 116. Thus, according to the present disclosure, even when a plurality of IP addresses are attacked at the same time (a plurality of targets are handled at the same time), resource load distribution between sites is performed while an increase in delay of target-addressed communications due to the handling is prevented, thereby enabling handling of more DDoS attacks.

Although an embodiment of the present disclosure has been described in detail above, the present disclosure is not limited to this specific embodiment and various modifications and changes can be made within the scope of the spirit of the present disclosure described in the claims.

For example, the DDoS handling apparatus 100 includes the load distribution target reduction unit 114 and the grouping processing unit 115 in the above embodiment, but the present disclosure can also be applied when only one of them is provided.

In addition, the DDoS handling apparatus 100 and the traffic information collection/DDoS attack detection apparatus 200 are implemented as separate apparatuses in the above embodiment, but both may be implemented as one apparatus.

REFERENCE SIGNS LIST

100 DDoS handling apparatus
110 Processing unit
111 Attack detection message processing unit
112 Load distribution determination unit
113 Processability determination unit
114 Load distribution target reduction unit
115 Grouping processing unit
116 Load distribution processing unit
117 Attack handling setting unit
118 Readjustment/handling termination determination unit
120 Storage unit
121 Traffic information table
122 Mitigation site information table
123 GW to site correspondence information table
124 Attack identification information table
125 Attack information table
126 Group information table
127 Group to communication identifier correspondence information table
128 First site information table for each attack
129 Second site information table for each attack
130 Communication unit
200 Traffic information collection/DDoS attack detection apparatus
300 Mitigation apparatus
400 Packet transfer device

The invention claimed is:

1. A DDoS handling apparatus configured to handle target-addressed communications addressed to targets of DDoS attacks, the target-addressed communications flowing, from at least one adjacent autonomous system, in an autonomous system including a plurality of mitigation sites against DDoS attacks, the DDoS handling apparatus comprising:

a memory; and a hardware processor operatively connected to the memory;

the hardware processor configured to implement a load distribution determination unit configured to detect whether load distribution processing is to be performed based on both available resource information of a mitigation site corresponding to a gateway device, through which the sum of amount of target-addressed communications flow in, and a communication resource amount of the target-addressed communications and set current handling states of target IP-addresses;

a processability determination unit configured to determine whether the load distribution processing is capable of being performed within a desired time based on a number of the target-addressed communications when the load distribution determination unit has determined that the load distribution processing is determined to be performed;

a grouping processing unit, configured to group the target-addressed communications into a plurality of groups when the processability determination unit has determined that the load distribution processing is not capable of being performed, wherein the target-addressed communications are grouped with, as a unit, a set of a mitigation site corresponding to a gateway device through which the target-addressed communications flows out and a current handling state of the target-addressed communications;

a load distribution processing unit, including one or more processors, configured for each group, to determine a mitigation site to be used to handle the target-addressed communications belonging to the group from among the plurality of mitigation sites such that a shortage of resources of the mitigation sites is resolved for the target-addressed communications belonging to the group; and an attack handling setting unit configured to perform route control such that the target-addressed communications pass through the determined mitigation site by the load distribution processing unit of the DDoS handling apparatus.

2. The DDoS handling apparatus according to claim 1, wherein the hardware processor is further configured to implement a load distribution target reduction unit configured to reduce the number of the target-addressed communications that are targets of the load distribution processing when the load distribution processing is not capable of being performed, wherein grouping the target-addressed communications comprises grouping the target-addressed communications into a group information table after the reduction.

3. The DDoS handling apparatus according to claim 2, wherein the load distribution target reduction unit is configured to reduce the number of the target-addressed communications that are targets of the load distribution processing based on either or both of a resource amount of a mitigation site available to the target-addressed communications or a communication amount of the target-addressed communications.

4. A DDoS handling method performed by a DDoS handling apparatus comprising a hardware processor configured to handle target-addressed communications addressed to targets of DDoS attacks, the target-addressed communications flowing, from at least one adjacent autonomous system, in an autonomous system including a plurality of mitigation sites against DDoS attacks, the DDoS handling method comprising:

detecting, by a load distribution determination unit implemented by the hardware processor, operatively coupled to a memory, whether load distribution processing is to be performed based on both available resource information of a mitigation site corresponding to a gateway device, through which the sum of amount of the target-addressed communications flow in, and a communication resource amount of the target-addressed communications and setting current handling states of target IP-addresses;

determining, by a processability determination unit, whether the load distribution processing is capable of being performed within a desired time based on a number of the target-addressed communications when the load distribution processing is determined to be performed;

grouping, by a grouping processing unit the target-addressed communications into a plurality of groups when the processability determination unit has determined that the load distribution processing is not capable of being performed, wherein the target-addressed communications are grouped with, as a unit, a set of a mitigation site corresponding to a gateway device through which the target-addressed communications flows out and a current handling state of the target-addressed communications;

determining, by a load distribution processing unit, for each group, a mitigation site to be used to handle the target-addressed communications belonging to the group from among the plurality of mitigation sites such that a shortage of resources of the mitigation sites is resolved for the target-addressed communications belonging to the group; and performing, by an attack handling setting unit, route control such that the target-addressed communications pass through the determined mitigation site by the load distribution processing unit of the DDoS handling apparatus.

5. The DDoS handling method according to claim 4, further comprising:

reducing, by a load distribution target reduction unit implemented by the hardware processor, reducing the number of the target-addressed communications that are targets of the load distribution processing when the processability determination unit has determined that the load distribution processing is not capable of being performed, wherein grouping the target-addressed communications comprises grouping the target-addressed communications into a group information table after the reduction.

6. The DDoS handling method according to claim 5, further comprising:

reducing, by the load distribution target reduction unit, the number of the target-addressed communications that are targets of the load distribution processing based on either or both of a resource amount of a mitigation site available to the target-addressed communications or a communication amount of the target-addressed communications.

7. A non-transitory computer readable medium storing one or more instructions for causing a computer to operate as each unit of a DDoS handling apparatus comprising hardware processor configured to handle target-addressed communications addressed to targets of DDoS attacks, the target-addressed communications flowing, from at least one adjacent autonomous system, in an autonomous system including a plurality of mitigation sites against DDoS attacks, the one or more instructions causing the computer to execute:

detecting, by a load distribution determination unit implemented by the hardware processor, operatively coupled to a memory, whether load distribution processing is to be performed based on both available resource information of a mitigation site corresponding to a gateway device, through which the sum of amount of the target-addressed communications flow in, and a communication resource amount of the target-addressed communications and setting current handling states of target IP-addresses;

determining, by a processability determination unit, whether the load distribution processing is capable of being performed within a desired time based on a number of the target-addressed communications when the load distribution processing is determined to be performed;

grouping, by a grouping processing unit, the target-addressed communications into a plurality of groups when the processability determination unit has determined that the load distribution processing is not capable of being performed, wherein the target-addressed communications are grouped with, as a unit, a set of a mitigation site corresponding to a gateway device through which the target-addressed communications flows out and a current handling state of the target-addressed communications;

determining, by a load distribution processing unit, for each group, a mitigation site to be used to handle the target-addressed communications belonging to the group from among the plurality of mitigation sites such that a shortage of resources of the mitigation sites is resolved for the target-addressed communications belonging to the group; and performing, by an attack handling setting unit, route control such that the target-addressed communications pass through the determined mitigation site by the load distribution processing unit of the DDoS handling apparatus.

8. The non-transitory computer readable medium according to claim 7, wherein the one or more instructions further cause the computer to execute:

reducing, by a load distribution target reduction unit implemented by the hardware processor, the number of the target-addressed communications that are targets of the load distribution processing when the processability determination unit has determined that the load distribution processing is not capable of being performed, wherein grouping the target-addressed communications comprises grouping the target-addressed communications into a group information table after the reduction.

9. The non-transitory computer readable medium according to claim 8, wherein the one or more instructions further cause the computer to execute:

reducing, by the load distribution target reduction unit, the number of the target-addressed communications that are targets of the load distribution processing based on either or both of a resource amount of a mitigation site available to the target-addressed communications or a communication amount of the target-addressed communications.

* * * * *